(12) United States Patent
Lutz et al.

(10) Patent No.: US 9,266,524 B2
(45) Date of Patent: Feb. 23, 2016

(54) METHOD AND SYSTEM FOR MANAGING THE POWER OF A HYBRID VEHICLE

(75) Inventors: Philippe Lutz, Le Vesinet (FR); Damien Fournigault, Conflans-Sainte-Honorine (FR); Dominique Boutrot, Chatou (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 68 days.

(21) Appl. No.: 14/129,368

(22) PCT Filed: Jun. 27, 2012

(86) PCT No.: PCT/FR2012/051477
§ 371 (c)(1),
(2), (4) Date: Jan. 13, 2014

(87) PCT Pub. No.: WO2013/001233
PCT Pub. Date: Jan. 3, 2013

(65) Prior Publication Data
US 2014/0129070 A1 May 8, 2014

(30) Foreign Application Priority Data

Jun. 28, 2011 (FR) .................................. 11 55736

(51) Int. Cl.
*B60L 9/00* (2006.01)
*B60W 20/00* (2006.01)
(Continued)

(52) U.S. Cl.
CPC ............... *B60W 20/00* (2013.01); *B60L 11/14* (2013.01); *B60L 11/1862* (2013.01); *B60W 10/06* (2013.01); *B60W 10/08* (2013.01);
(Continued)

(58) Field of Classification Search
CPC .... B60L 11/14; B60L 11/1862; B60W 10/06; B60W 10/08; B60W 10/26; B60W 20/104; B60W 50/0097; H01M 10/44; H01M 10/46; H02J 7/00; H02J 7/14
See application file for complete search history.

(56) References Cited

U.S. PATENT DOCUMENTS 4,170,201 A * 10/1979 Camp et al. ................... 123/682
5,778,326 A 7/1998 Moroto et al.
(Continued)

FOREIGN PATENT DOCUMENTS

EP   1 932 740 A1   6/2008
FR   2 953 340 A1   6/2011

OTHER PUBLICATIONS

The Elements of Style, all pages, 1979.*
(Continued)

*Primary Examiner* — Calvin Cheung
(74) *Attorney, Agent, or Firm* — Osha Liang LLP

(57) ABSTRACT

The invention relates to a method for managing the power of a hybrid vehicle selectively driven by an electric motor and a heat engine, the electric motor being supplied with power by a power storage unit capable of being recharged by the heat engine, wherein according to the method the level of charge of the power storage unit is monitored so as to select the mode in which the vehicle is driven by the heat engine or that in which the vehicle is driven by the electric motor, said method including the steps of: determining a travelling profile of the vehicle associated with a path of said vehicle; and determining (36), according to said travelling profile, a threshold level of charged (S2), referred to as authorized threshold, below which the mode in which the vehicle is driven by the heat engine is activated.

18 Claims, 2 Drawing Sheets

(51) Int. Cl.

| | | |
|---|---|---|
| *B60L 11/18* | (2006.01) | |
| *B60W 10/06* | (2006.01) | |
| *B60W 10/08* | (2006.01) | |
| *B60W 10/26* | (2006.01) | |
| *H02J 7/00* | (2006.01) | |
| *H02J 7/14* | (2006.01) | |
| *H01M 10/44* | (2006.01) | |
| *H01M 10/46* | (2006.01) | |
| *B60W 50/00* | (2006.01) | |
| *B60L 11/14* | (2006.01) | |
| *B60W 50/14* | (2012.01) | |

(52) U.S. Cl.
CPC ............ *B60W 10/26* (2013.01); *B60W 20/104* (2013.01); *B60W 50/0097* (2013.01); *H01M 10/44* (2013.01); *H01M 10/46* (2013.01); *H02J 7/00* (2013.01); *H02J 7/14* (2013.01); *B60W 20/102* (2013.01); *B60W 2050/146* (2013.01); *B60W 2510/244* (2013.01); *B60W 2550/143* (2013.01); *B60W 2550/22* (2013.01); *B60W 2550/402* (2013.01); *B60W 2710/244* (2013.01); *B60W 2720/103* (2013.01); *Y02T 10/6291* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/84* (2013.01); *Y10S 903/93* (2013.01)

(56) References Cited

U.S. PATENT DOCUMENTS

| | | | | |
|---|---|---|---|---|
| 5,927,415 | A | * | 7/1999 | Ibaraki et al. ............ 180/65.25 |
| 6,594,564 | B1 | * | 7/2003 | Vahle et al. ................... 701/410 |
| 6,787,932 | B2 | * | 9/2004 | Takaoka et al. ............ 290/40 C |
| 8,954,255 | B1 | * | 2/2015 | Crawford ....................... 701/93 |
| 2004/0229631 | A1 | * | 11/2004 | George ...................... 455/456.1 |
| 2006/0129313 | A1 | * | 6/2006 | Becker et al. ................. 701/202 |
| 2006/0211430 | A1 | * | 9/2006 | Persico ...................... 455/456.1 |
| 2006/0278449 | A1 | | 12/2006 | Torre-Bueno |
| 2007/0112475 | A1 | | 5/2007 | Koebler et al. |
| 2009/0018766 | A1 | * | 1/2009 | Chen et al. .................... 701/202 |
| 2009/0259355 | A1 | * | 10/2009 | Li ..................................... 701/22 |
| 2009/0277701 | A1 | | 11/2009 | Soma et al. |
| 2009/0277704 | A1 | * | 11/2009 | Yamaguchi ................ 180/65.31 |
| 2010/0185349 | A1 | * | 7/2010 | Harada et al. ................... 701/22 |
| 2012/0035795 | A1 | * | 2/2012 | Yu ..................... B60W 50/0097 701/22 |
| 2012/0208672 | A1 | * | 8/2012 | Sujan et al. ....................... 477/5 |
| 2013/0297193 | A1 | * | 11/2013 | Morisaki ...................... 701/112 |
| 2013/0304347 | A1 | * | 11/2013 | Davidson ........................ 701/99 |

OTHER PUBLICATIONS

International Search Report for corresponding International Application No. PCT/FR2012/051477, mailed May 17, 2013 (6 pages).

* cited by examiner

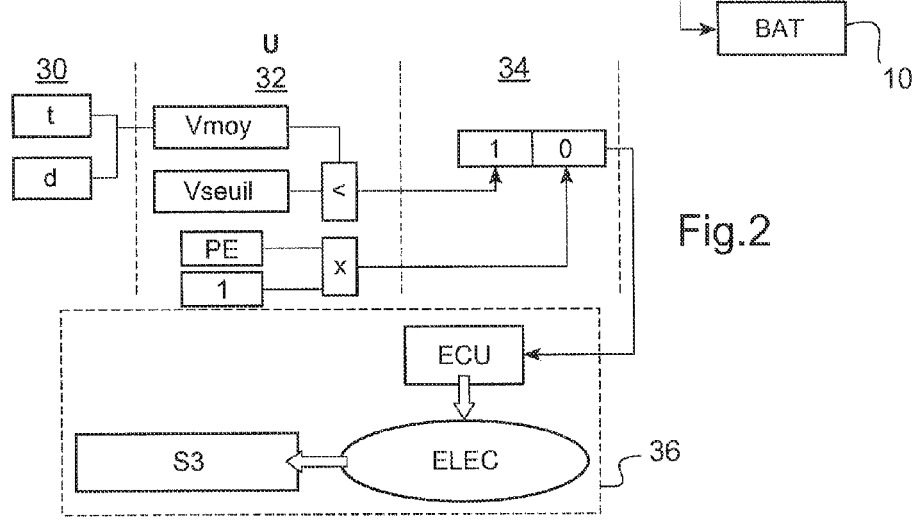
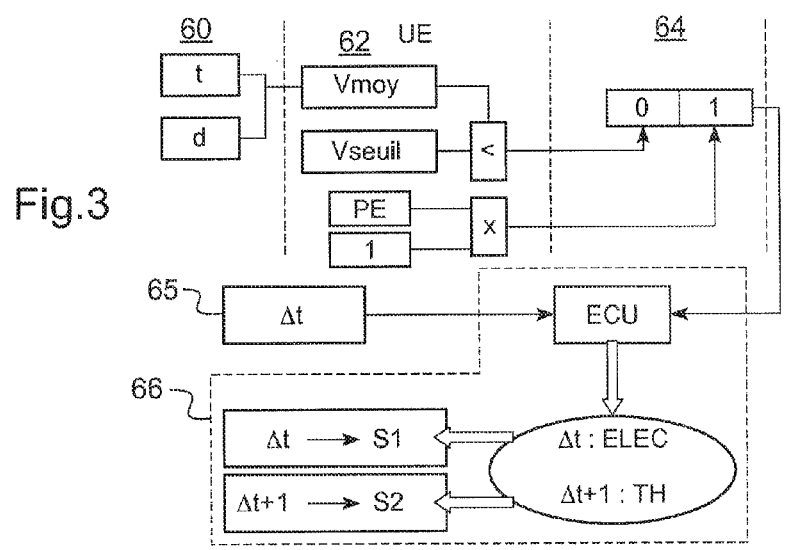

METHOD AND SYSTEM FOR MANAGING THE POWER OF A HYBRID VEHICLE

The present invention relates to a power management method for a hybrid vehicle. It also relates to a corresponding management system.

More particularly, the invention relates to the field of hybrid automobiles.

Generally, a hybrid vehicle employs a plurality of separate power sources to drive the vehicle. These sources conventionally comprise a heat engine and an electric motor associated with a power storage unit of the battery type.

Relative to a conventional exclusively heat driven vehicle, the presence of a second power source in a hybrid vehicle introduces an additional degree of freedom with regard to providing the power required by the driver of the vehicle.

It is therefore necessary to find a way of employing the various available sources efficiently. Specifically, poor power management could result in analogous or even higher consumption than for an equivalent conventional vehicle, in particular due to the additional weight of the electric motor and the associated power electronics, whereas hybrid vehicles are meant to achieve the opposite.

Power management methods for hybrid automotive vehicles allowing the power requested by the driver to be provided by various sources so as to minimize the consumption of fuel or the emission of pollutants exist at the present time.

These methods in particular request the turn on and/or turn off of the heat engine and the alternation of recharge and/or discharge phases of the battery.

Optimization strategies used at the present time do not take into account the actual route taken by the vehicle. The requests generated may thus prove to be unsuitable for the actual route of the vehicle.

More particularly, existing strategies for optimizing hybrid vehicle energy budget are used, at an instant t of a journey, to minimize fuel consumption for an instantaneous powertrain operating point defined by a torque and an engine speed. However, constraints considered as being of higher priority, especially the recharge of the battery, frequently mean that a drive mode that is detrimental to consumption savings is employed.

Generally, in existing strategies, the driving conditions at the instant t will dictate the choice of the source of the drive torque, namely favoring, under urban driving conditions, pure electrical drive power and favoring, under extra urban driving conditions, especially freeway driving conditions, drive power supplied by the heat engine. However, it is the battery charge level at the instant t that has the final say on the choice of the source of drive power. For example, under urban driving conditions, once the battery reaches what is called a SOC (state of charge) charge level representing a preset and fixed authorized maximum discharge level, the heat engine is turned on in order to recharge the battery even though this increases consumption and the emission of pollutants.

Authorized maximum discharge levels are often set low (minimum remaining charge threshold of about 70%) in order to prevent prolonged battery discharges and ensure optimal electrical power supply availability during a trip. However, these low discharge levels minimize potential improvements with respect to the decrease of polluting emissions.

The present invention aims to improve the situation.

For this purpose, the invention firstly relates to a power management method for a hybrid vehicle selectively driven by an electric motor and by a heat engine, the electric motor being supplied with power by a unit for storing electrical power able to be recharged by the heat engine, method in which a charge level of the power storage unit is monitored in order to select a heat engine or electric motor drive mode, said method comprising steps of:
  evaluating a route profile for the vehicle, associated with a trip of said vehicle; and
  evaluating, depending on said route profile, a threshold charge level called the authorized threshold, below which the heat engine drive mode is activated.

By taking the trip route into account it is possible to adapt the authorized maximum discharge threshold to the parameters of the trip to come, and therefore to increase the potential for decreased consumption while managing the risk of excessive discharge of the battery during this trip.

Advantageously, the method comprises a step of requesting the recharge of the storage unit if the charge level drops below the authorized threshold, said recharge request comprising a request that the heat engine turn on.

Thus, the storage unit may be recharged under driving conditions that are optimal from the point of view of fuel consumption and the emission of pollutants.

Advantageously, the step of evaluating the route profile comprises evaluating the nature of the trip between a specified starting point and a specified endpoint.

Preferably, the nature of the trip is chosen from at least one trip comprising an extra urban portion and one trip not comprising an extra urban portion. An extra urban portion corresponds to a fast road portion in which the speed of the vehicle may be higher than a preset speed threshold.

For example, the nature of the trip is evaluated from the maximum speed profile of the trip. In particular, the maximum speed profile may be made up of authorized maximum speeds, such as speed limits, encountered on the trip. Thus, a portion of the trip having a speed limit higher than 90 km/h, even higher than 50 km/h, may be considered to be a fast road portion. The speed profile is especially provided by a mapping system or a GPS (global positioning system) system.

In another example, the step of evaluating the route profile comprises evaluating the trip distance and the trip time, and the nature of the trip is evaluated from the average speed of the trip, said average speed being obtained from said distance and said time.

In particular if the average speed of the trip is higher than an average speed threshold, the trip comprises an extra urban portion; if the average speed is lower than the average speed threshold, the trip does not comprise an extra urban portion. The average speed threshold is for example equal to 25 km/h, even 30 km/h. Advantageously, the average speed threshold is calibratable, so that it can be modified.

Advantageously, when the trip comprises an extra urban portion, the evaluation of the route profile comprises evaluating the trip time between the starting point and the start of the extra urban portion, the evaluation of the authorized threshold consisting in setting said authorized threshold to a first threshold for this time and setting said authorized threshold to a second threshold higher than the first threshold after this time.

The first threshold is, preferably, comprised between 20% and 30%.

The second threshold ensures optimal electrical power supply availability for the vehicle. The second threshold is, preferably, comprised between 60% and 80%.

By employing a lower threshold before the extra urban portion, the turn-on of the heat engine may be delayed when the vehicle is in the urban phase of the trip. Thus, the battery is recharged during the freeway phase of the trip, during which phase such a recharge has a higher overall energy efficiency. This furthermore makes for a more optimal freeway journey phase since this phase is more efficient with the heat engine.

In one embodiment, the first threshold depends on the trip time between the starting point and the start of the extra urban portion. Thus, the time taken to reach the freeway may be used as a weighting parameter for the authorized threshold.

Advantageously, the authorized threshold is equal to a third threshold higher than or equal to the first threshold and lower than the second threshold, when the trip does not comprise an extra urban portion.

The third threshold is advantageously comprised between 40% and 50%.

A trip not comprising an extra urban portion is typically a trip under urban driving conditions, for which it is preferable to use the electric motor to supply drive power. Turning on the heat engine results in increased consumption and pollution, the catalyst being thermally inactive. In prior-art methods, the engine may be turned on even though the battery could support the slight additional discharge required to reach a targeted destination. Employing an authorized threshold specific to a trip not comprising an extra urban portion especially allows the permitted battery discharge to be increased. Thus, overly premature turn-on of the heat engine is avoided.

Advantageously, the starting point and/or the endpoint are defined by their geographical coordinates, especially their GPS and/or map coordinates.

Preferably, the endpoint is input by a user, typically the driver of the vehicle.

The invention also relates to a power management system for a hybrid vehicle selectively driven by an electric motor and by a heat engine, the electric motor being supplied with power by a unit for storing electrical power able to be recharged by the heat engine, said system comprising:
- a unit for monitoring a charge level of the power storage unit in order to select a heat engine or electric motor drive mode;
- a unit for evaluating a route profile for the vehicle, associated with a trip of said vehicle; and
- a unit for evaluating a threshold charge level called the authorized threshold, below which the heat engine drive mode is activated, depending on said route profile.

Advantageously, the unit for evaluating a route profile comprises a tracking device, especially a GPS and/or a map.

Preferably, the system furthermore comprises a unit for communicating with a user of the vehicle, in particular a human-machine interface.

Nonlimiting embodiments of the invention will now be described in more detail with regard to the appended drawings, in which:

FIG. 1 is a schematic showing the structure of a power management system according to one embodiment of the invention;

FIG. 2 is a flow chart illustrating the steps of the power management method according to a first variant embodiment of the invention;

FIG. 3 is a flow chart illustrating the steps of the power management method according to a second variant embodiment of the invention;

FIG. 1 illustrates a power management system 2 for an automotive vehicle, for example a hybrid automotive vehicle. This management system is, preferably, an on-board system.

Figure 4:
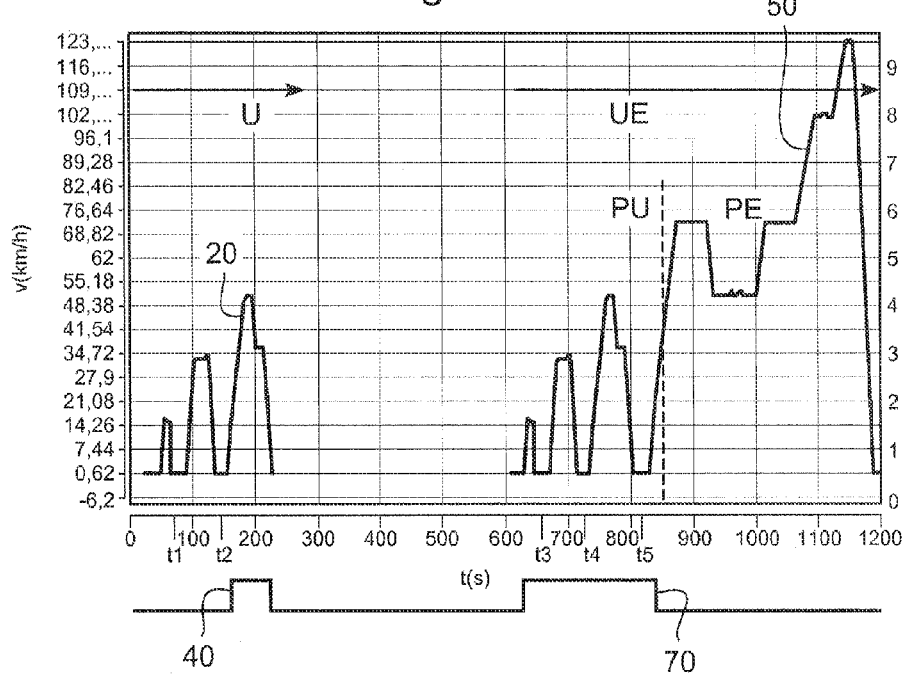
FIG. 4 is a graph illustrating an example implementation of one prior-art power management method.

The management system 2 comprises a power management unit such as a central ECU 4.

The central ECU 4 is connected to a powertrain of the vehicle. The powertrain comprises a motor and engine for providing front-wheel/rear-wheel drive, and especially a heat engine 6, an electric motor 8, and a transmission chain.

The central ECU 4 is also connected to a power storage unit, especially a battery 10 the charge level of which is monitored.

Preferably, the central ECU 4 is connected to a human-machine interface IHM 12 allowing it to communicate with a driver 14 of the vehicle.

The human-machine interface 12 thus allows the driver 14 to be informed of fuel consumption, battery 10 charge level, power cost, $CO_2$ emission, carbon footprint, etc.

At their end, the driver 14 can input, by means of the human-machine interface 12, information intended for the central ECU 4.

According to a preferred embodiment, the management system 2 also comprises a GPS system connected to the central ECU 4, or a mapping system 16 able to evaluate a route to follow from a starting point and an endpoint.

Notably, the central ECU 4 is able to take into account a route profile input by the driver 14 via the human-machine interface 12 and/or output by the GPS system or the mapping system 16 when evaluating what is called an authorized charge threshold level for the battery 10, below which level the heat engine 6 drive mode must be activated.

The route profile is for example defined by the trip distance, the trip time and the nature of the trip, between a starting point and an endpoint defined by their geographical coordinates, especially their GPS coordinates.

The starting point corresponds to the position of the vehicle when it is started up and the endpoint corresponds to the position of the destination of the vehicle. This endpoint may be input by the driver 14 via the human-machine interface 12.

FIG. 3 is a flow chart illustrating the operation of the method of the invention, when the route profile corresponds to a trip UE comprising an urban portion PU followed by an extra urban portion PE, i.e. a fast road portion such as a freeway portion.

Figure 5:
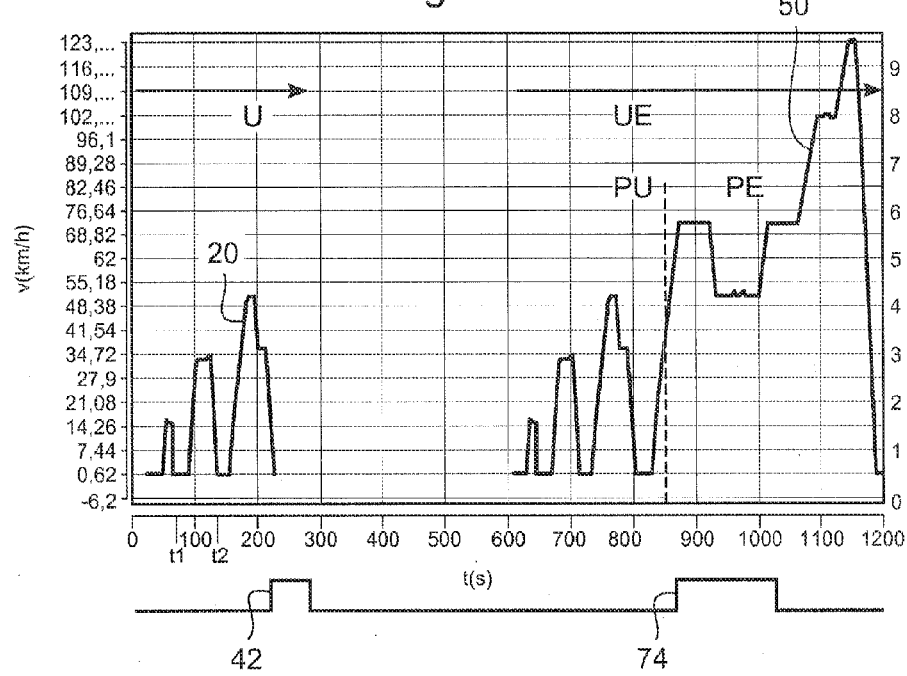
FIG. 5 is a graph illustrating an example implementation of the power management method of the invention.

The speed profile associated with the trip UE is shown by the curve 50 in FIGS. 4 and 5.

The curve 50 contains an urban portion PU for the length of time comprised between 600 and 850 s, and an extra urban portion PE for the length of time comprised between 850 and 1200 s.

The speed profile shows that the vehicle stops frequently in the urban portion PU of the trip, for example at the instants t3, t4 and t5. The maximum speed of the vehicle in this urban portion does not exceed 50 km/h.

In the extra urban portion PE the vehicle does not stop and its speed never drops below 50 km/h.

For example, the nature of the trip is determined by comparing the average speed Vmoy of the trip with an average speed threshold Vseuil.

The average speed threshold Vseuil may be determined from a typical "maximum" time and a typical "maximum" distance for a trip under urban driving conditions. The maximum time is preferably equal to 35 minutes. The maximum distance is preferably comprised between 15 and 18 km. These values lead to an average speed threshold Vseuil over the trip of 25 to 30 km/h, possibly justifying the use of a purely electrical drive mode.

In a step 60 the driver 14 enters into the human-machine interface 12 the trip time t of the trip UE. They also enter the trip distance d of the trip UE. By way of example, the distance d of the trip UE is equal to 15 km and the time t is about 12 minutes.

As a variant, this information may be output directly from the GPS system and/or the mapping system 16 and transmitted directly to the central ECU 4.

In a step 62, the central ECU 4 evaluates the average speed Vmoy of the trip, i.e. here an average trip speed Vmoy of 75 km/h, and compares it to the average speed threshold Vseuil.

In step 64, the central ECU 4 determines that the average speed Vmoy is largely above the threshold of 30 km/h. Therefore, there is an extra urban portion in the trip UE.

In step 65, the central ECU 4 evaluates the trip time Δt between the starting point and the start of the extra urban portion PE.

The central ECU 4 then decides, in step 66, that the authorized charge threshold level for the trip to come is equal to a first threshold S1 of 20 to 30% for the time Δt under urban driving conditions PU and to a second threshold S2 of 60 to 80% after the time Δt. Thus, the central ECU 4 is configured to delay use of the heat engine 6 by favoring the use of the electric motor 8 during the time Δt before the freeway is reached.

The central ECU 4 is also configured to decide whether to activate the heat engine 6 after the time Δt (i.e. at Δt+1) once the second threshold S2 is reached. Thus, the battery 10 may be recharged, if required, during the time that the extra urban portion PE lasts.

The second threshold S2 preferably has a value ensuring optimal electrical power supply availability. In prior-art strategies, once the charge level of the battery 10 dropped below this threshold S2 the heat engine 6 was turned on in order to recharge the battery 10 whatever the trip time and/or distance.

The curve 70 in FIG. 4 illustrates the heat engine being turned on a very short time after start up of the vehicle. In this case, the operating conditions of the heat engine 6 are suboptimal because it is cold started on an urban trip. This results in extra fuel consumption and pollution.

In contrast, when the method of the invention is used to set the authorized first threshold S1 lower than the second threshold S2, even though the charge level of the battery drops below the second threshold S2 the battery 10 is not recharged during the time Δt between the starting point and the start of the extra urban portion PE. This is because this recharge is delayed because the management system of the invention knows that more favorable journey conditions, namely the extra urban portion PE, are to come.

Thus, as illustrated by the curve 74, the battery 10 is recharged during the extra urban portion PE of the journey. This makes optimal heat engine 6 efficiency in terms of pollutant emission possible.

FIG. 2 is a flow chart illustrating an example of the operation of the method of the invention when the route profile corresponds to a uniquely urban trip U, i.e. one that does not contain an extra urban portion PE.

For example, the nature of the trip is determined by comparing the average speed of the trip with an average speed threshold of 30 km/h.

In a step 30, the driver 14 enters into the human-machine interface 12 the time t of the trip U. They also enter the distance d of the trip U. This information is transmitted to the central ECU 4.

As a variant, this information may be output directly by the GPS system and/or the mapping system 16 and transmitted directly to the central ECU 4.

In a step 32, the central ECU 4 calculates the average trip speed Vmoy of the vehicle from the distance d and the time t of the trip and compares it to the average speed threshold Vseuil.

In step 34, the central ECU 4 (the ECU in this example) determines that the average speed Vmoy is lower than the average speed threshold Vseuil and therefore that the trip U does not contain an extra urban portion PE.

The central ECU 4 then decides, in step 36, to set, for the trip to come, the minimum charge level of the battery 10 to a third threshold S3 higher than or equal to the first threshold S1, and lower than the second threshold S2. For example, the third threshold S3 is comprised between 40% and 50%. The system is thus configured to delay use of the heat engine 6 by favoring the use of the electric motor 8 as long as the charge level of the battery 10 is higher than the third threshold S3. During the trip, the charge level is permanently monitored and compared to the third threshold S3.

The third threshold S3 is, preferably, higher than the first threshold S1 used during the time Δt in a trip having an extra urban portion PE. This is because, in a trip containing an extra urban portion PE, it is possible to justify greater discharge of the battery 10 knowing that the extra urban portion PE will allow the battery 10 to be recharged.

The third threshold S3 is lower than the authorized threshold S2 ensuring optimal electrical power supply availability generally used in the prior art, which is comprised between 60% and 80%.

In prior-art strategies, once the charge level of the battery drops below the authorized threshold S2 the heat engine is turned on in order to recharge the battery 10 whatever the nature of the trip, i.e. for trips containing an extra urban portion PE or for trips not containing an extra urban portion PE.

By way of example, the distance of the trip U is equal to less than 2 km and its time is about 4.5 minutes for an average speed of 24 km/h. An example speed profile associated with the urban trip U is shown by the curve 20 in FIGS. 4 and 5.

This speed profile shows the vehicle stopping frequently, for example at instants t1 and t2. The maximum speed of the vehicle in this trip does not exceed 50 km/h.

The curve 40 in FIG. 4 illustrates the heat engine 6 turning on a very short time (about one minute) before the vehicle arrives at its destination. In this case, activation of the heat engine 6 is very disadvantageous in terms of fuel consumption and the emission of pollutants. Furthermore, since the journey time is too short, the battery 10 is not completely recharged.

In contrast, when the method of the invention is used to set the authorized third threshold S3 lower than the second threshold S2, the trip is carried out entirely under the electric motor 8 even though the charge level of the battery 10 drops below the second threshold S2, thereby minimizing the emission of pollutants. The battery 10 will possibly be recharged either at the final destination (curve 42), if this is technically possible, by connecting it to a mains network, or during the following trip if necessary.

The invention claimed is:

1. A power management method for a hybrid vehicle selectively driven by an electric motor and by a heat engine,
   the electric motor being supplied with power by a unit for storing electrical power able to be recharged by the heat engine,
   wherein a charge level of the power storage unit is monitored in order to select a heat engine or electric motor drive mode, the power management method comprising:
  inputting a route profile into a central ECU;
  evaluating a route profile for the hybrid vehicle associated with a trip of the hybrid vehicle, wherein evaluating the rout profile comprises:
    evaluating a trip distance, a trip time, and a nature of the trip, between a specified point and a specified endpoint; and
  setting, depending on the route profile, a threshold charge level, called an authorized threshold, below which a heat engine drive mode is activated,
  wherein the nature of the trip is evaluated from an average speed of the trip, the average speed being obtained from the trip distance and the trip time,
  wherein the nature of the trip is chosen from at least one trip comprising an extra urban portion and one trip not comprising an extra urban portion,
  wherein if the average speed of the trip is higher than an average speed threshold, the trip comprises an extra urban portion, and
  wherein if the average speed is lower than the average speed threshold, the trip does not comprise an extra urban portion.

2. The method as claimed in claim 1, further comprising: requesting the recharge of the storage unit if the charge level drops below the authorized threshold, the recharge request comprising a request that the heat engine turn on.

3. The method as claimed in claim 1, wherein the nature of the trip is evaluated from a speed profile of the trip.

4. The method as claimed in claim 1, wherein at least one of the starting point or the endpoint are defined by their geographical coordinates.

5. The method as claimed in claim 4, wherein the endpoint is input by a user.

6. The method as claimed in claim 1, wherein the route profile is input into the central ECU via a human-machine interface.

7. A power management method for a hybrid vehicle selectively driven by an electric motor and by a heat engine,
  the electric motor being supplied with power by a unit for storing electrical power able to be recharged by the heat engine,
  wherein a charge level of the power storage unit is monitored in order to select a heat engine or electric motor drive mode,
  the power management method comprising:
    inputting a route profile into a central ECU;
    evaluating a route profile for the hybrid vehicle associated with a trip of the hybrid vehicle; and
    evaluating, depending on the route profile, a threshold charge level, called an authorized threshold, below which a heat engine drive mode is activated,
    wherein evaluating the route profile comprises evaluating a trip, distance, a trip time, and a nature of the trip, between a specified starting point and a specified endpoint,
    wherein the nature of the trip comprises an extra urban portion,
    wherein evaluating the route profile comprising evaluating the trip time between the starting point and the start of the extra urban portion,
    wherein evaluating the authorized threshold comprises setting the authorized threshold to a first threshold for the trip time and setting the authorized threshold to a second threshold higher than the first threshold after the trip time.

8. The method as claimed in claim 7, wherein the first threshold is between 20% and 30% of a maximum charge level.

9. The method as claimed in claim 7, wherein the second threshold is between 60% and 80% of a maximum charge level.

10. The method as claimed in claim 7, wherein the authorized threshold is equal to a third threshold higher than or equal to the first threshold and lower than the second threshold, when the trip does not comprise an extra urban portion.

11. The method as claimed in claim 10, wherein the third threshold is between 40% and 50% of a maximum charge level.

12. The method as claimed in claim 7, wherein evaluating the authorized threshold comprises setting the authorized threshold to a first threshold for the trip time between the starting point and the start of the extra urban portion.

13. A power management system for a hybrid vehicle selectively driven by an electric motor and by a heat engine,
  the electric motor being supplied with power by a unit for storing electrical power able to be recharged by the heat engine,
  the power management system comprising:
    a central ECU configured to monitor a charge level of the power storage unit in order to select a heat engine drive mode or an electric motor drive mode;
    a unit for evaluating a route profile for the hybrid vehicle associated with a trip of the hybrid vehicle; and
    a unit for setting a threshold charge level, called an authorized threshold, below which the heat engine drive mode is activated, depending on the route profile,
    wherein the unit for evaluating the authorized threshold is configured to evaluate a trip distance, a trip time, and a nature of the trip, between a specified starting point and a specified endpoint,
    wherein the nature of the trip is chosen from at least one trip comprising an extra urban portion and one trip not comprising an extra urban portion,
    wherein the nature of the trip is evaluated from an average speed of the trip, the average speed being obtained from the trip distance and the trip time,
    wherein if the average speed of the trip is higher than an average speed threshold, the trip comprises an extra urban portion, and
    wherein if the average speed of the trip is lower than the average speed threshold, the trip does not comprise an extra urban portion.

14. The system as claimed in claim 13, in which the unit for evaluating the route profile comprises a tracking device.

15. The system as claimed in claim 14, wherein the tracking device is one selected from a group consisting of a GPS and a map.

16. The system as claimed in claim 13, further comprising a human-machine interface for communicating with a user of the hybrid vehicle.

17. The system as claimed in claim 13, wherein the route profile is input into the central ECU.

18. The system as claimed in claim 17, wherein the route profile is input into the central ECU via a human-machine interface.

* * * * *